Feb. 26, 1952 F. E. WOODS ET AL 2,587,079

MULTIPLE SCALE GRAPHIC RECORDING MECHANISM

Filed April 6, 1946 4 Sheets-Sheet 1

*INVENTORS*
WILLARD P. WILLIAMS
FREDERICK E. WOODS
*BY*
Reynolds & Beach
ATTORNEYS

*INVENTORS*
WILLARD P. WILLIAMS
FREDERICK E. WOODS
*BY* Reynolds & Beach
ATTORNEYS

MULTIPLE SCALE GRAPHIC RECORDING MECHANISM

Filed April 6, 1946 4 Sheets-Sheet 3

INVENTORS
WILLARD P. WILLIAMS
FREDERICK E. WOODS
BY Reynolds & Beach
ATTORNEYS

MULTIPLE SCALE GRAPHIC RECORDING MECHANISM

Filed April 6, 1946 4 Sheets-Sheet 4

INVENTORS
WILLARD P. WILLIAMS
FREDERICK E. WOODS
BY Reynolds & Beach
ATTORNEYS

Patented Feb. 26, 1952 2,587,079

UNITED STATES PATENT OFFICE 2,587,079

MULTIPLE SCALE GRAPHIC RECORDING MECHANISM

Frederick E. Woods and Willard P. Williams, Seattle, Wash., assignors to Boeing Airplane Company, a corporation of Delaware Application April 6, 1946, Serial No. 660,120

12 Claims. (Cl. 346—66)

The recorder of this invention produces automatically a graph representing variable data. Such data may be of almost unlimited variety, such as temperature, pressure, speed, etc. Examples of typical applications for the recorder are for recording airplane flight test data and wind tunnel data. Any number of graphs, each representing a different factor, may be drawn simultaneously so that the values of the several factors at any particular time may be ascertained.

The principal advantage of the recorder over those previously used is the accuracy and reproduceability of the graph produced and the ease with which it may be interpreted, despite the extremely compact construction of the recorder.

It is an object not only to make the mechanism of simple, compact, and rugged construction, but also to produce a graph to a large scale on a comparatively narrow chart. This object is accomplished by employing coordinated continuous and interrupted graphs, the interrupted graph being drawn to a much larger scale than the continuous graph.

Such a recorder preferably operates in timed sequence with the element or elements producing the data to be recorded, but its operation may be either continuous or periodic. It is a further object, therefore, to provide time-indicating mechanism, were desired, which operates in coordination with other data-recording devices.

Various additional advantages will be pointed out in the description of the preferred form of our mechanism and its method of operation which follows.

Figure 1:
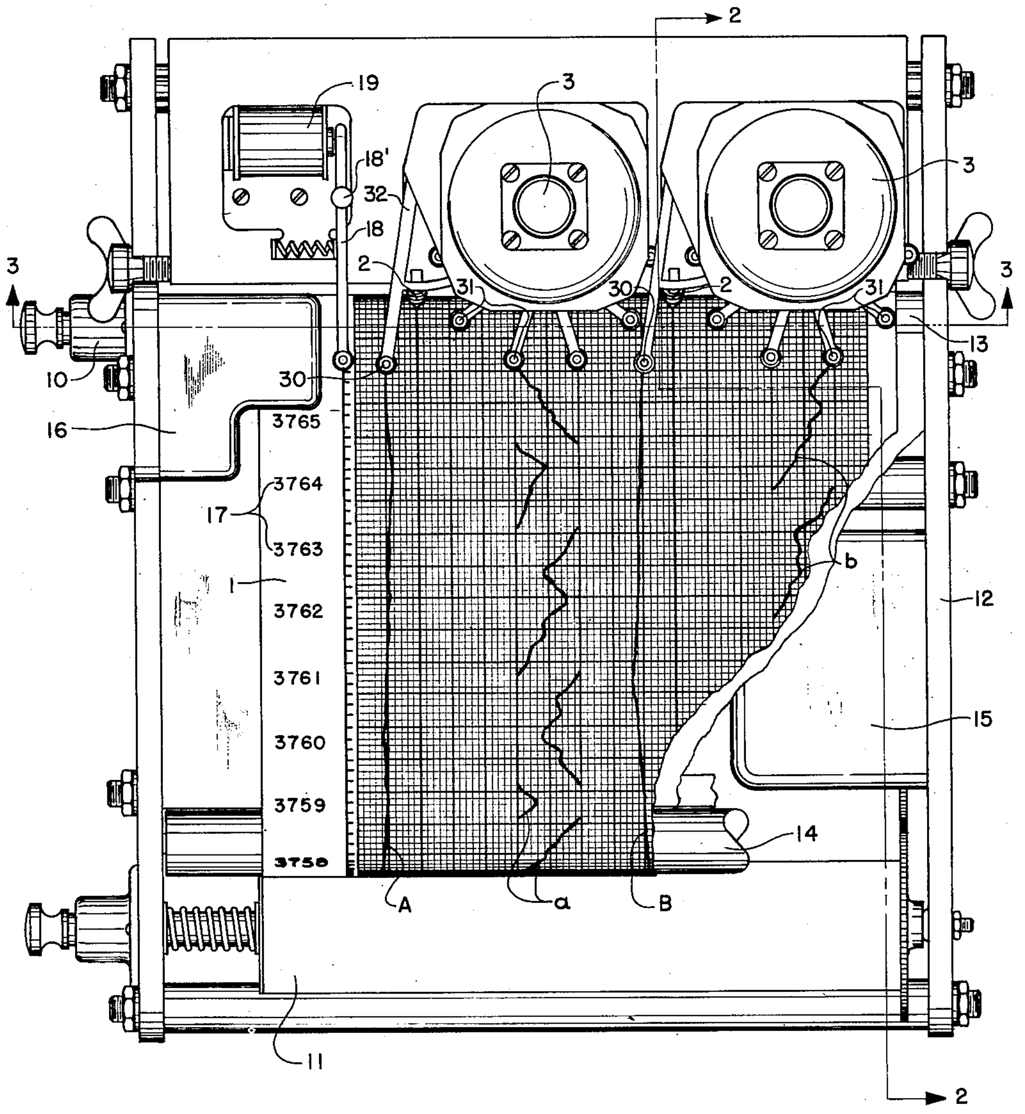
Figure 1 is a plan view of the recorder, parts being broken away.
Figure 2:
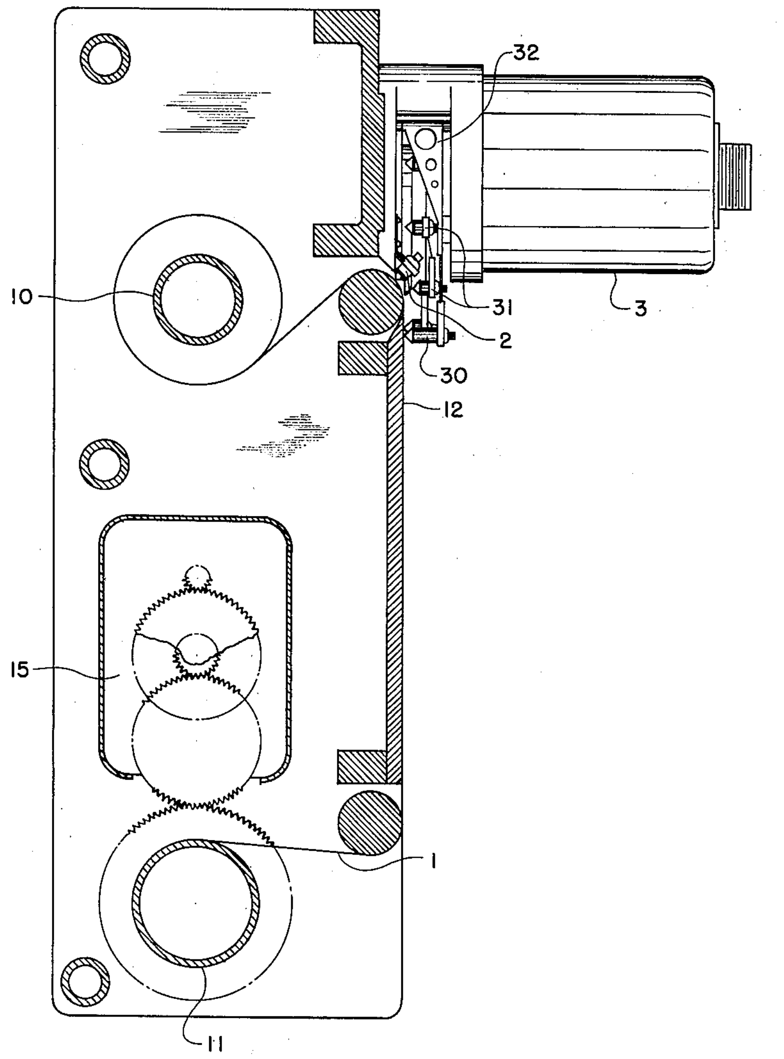
Figure 2 is a longitudinal sectional view taken on line 2—2 of Figure 1.
Figure 3:
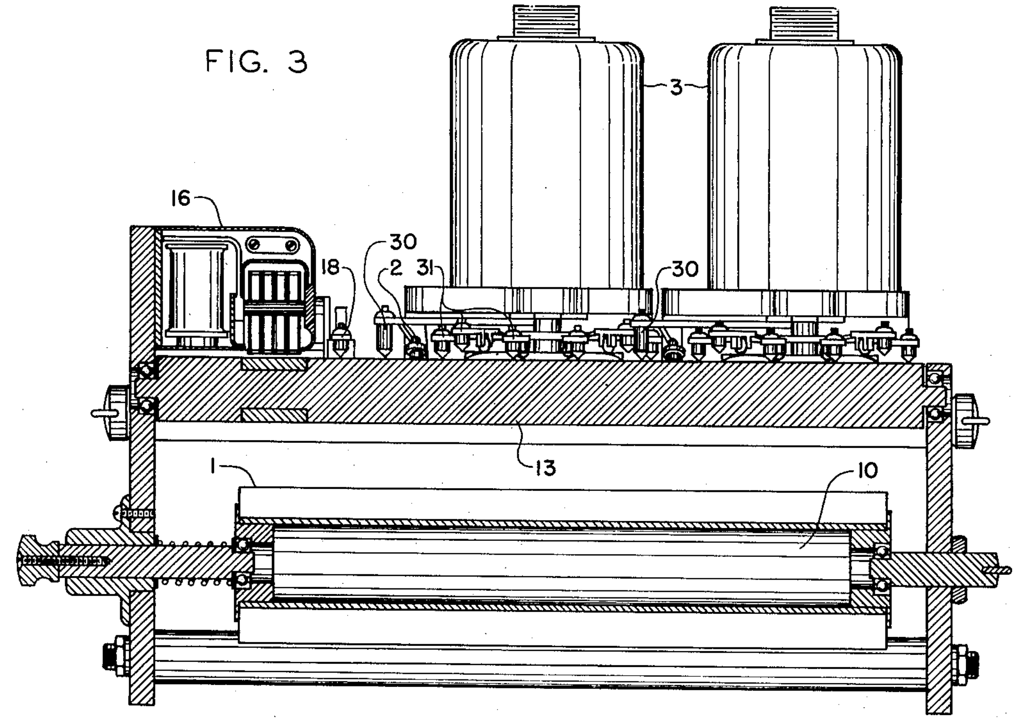
Figure 3 is a transverse sectional view taken on line 3—3 of Figure 1.

The recorder generally is of the type in which a tape or chart is translated in one direction, and is marked upon by styluses or pens shifted transversely of and substantially perpendicular to the direction of chart movement. Thus in Figure 1 the chart 1 is shown supported upon parallel rollers 10 and 11 spaced apart. The chart will be unrolled from the roller 10 and rolled up on roller 11 at a predetermined rate, and is guided for movement across the face of frame 12 by guide rollers 13 and 14 associated, respectively, with the supporting rollers. Timed movement of the strip is effected by drive mechanism 15 which rotates roller 11 positively, while the frictional resistance to unrolling of roller 10, accomplished in any suitable fashion, will maintain the strip taut.

To establish the proper time unit graduation lengthwise of the tape, a time stamper device 16 preferably is employed, which marks the numbers 17 on the margin of the strip, indicating uniform time increments. Depending upon the type of data being recorded, these increments may be short intervals, such as seconds or even fractions of a second, or may be long intervals, such as minutes or even hours. For recording flight test data in airplanes or wind tunnel data a relatively short time interval will be indicated by the numerals 17.

Cooperating with the stamping device 16 may be provided a marking element 18 driven by an electromagnet 19. This magnet may be energized periodically to swing such arm about its pivot 18′ to move the pen carried on the end of the arm remote from the magnet 19, for marking graduations along the margin of the strip 1 to identify test conditions or definite intervals of time. The ordinate graduations of the tape may thus denote time measurements, whereas the graduations transversely of the strip correspond to the factor being measured.

The chart 1 conveniently may be of readily obtainable squared or graph paper, and preferably is translucent to facilitate its reproduction by blueprinting. On such chart stationary pens 2, continuously bearing against the tape, draw zero lines to indicate any error in the transverse location or alignment of the chart and provide positive zero reference for recorded data. Alternatively a plain strip of paper can be employed, which will be marked with time graduations along its length by the mechanism described above during movement of the tape lengthwise, and at the same time a larger number of stationary pens 2 may be provided to draw a series of scale lines extending lengthwise of the tape.

Each data recording unit 3 is complete in itself, and the chart 1 may be made of any width to accommodate any number of such recording units, depending upon the number of factors which are to be recorded. Each recording unit 3 incorporates a motor, the shaft of which is positioned in response to movements, forces, etc. generated by the variable being measured. Several types of such motors, and associated apparatus for their control, are well known, and the details of this equipment form no part of this invention. The motor drives, through gearing to be described later, styluses or pens which move transversely of the direction of chart movement to produce graphs representing variations of the quantity being recorded.

In order to enable the data to be recorded and later interpreted with sufficient accuracy, a graph drawn to a relatively large scale is very desirable. A continuous graph drawn to a sufficiently large scale, however, in many instances would require a graph sheet and recording mechanism prohibitively large and heavy for such uses as recording flight test data, and in any type of installation such mechanism would be unnecessarily cumbersome. For example, to record air speed over a range of 0–400 miles per hour to a scale of 1 inch to 10 miles per hour would require a chart 40 inches wide, a size obviously impractical for installation in an airplane.

To overcome this disadvantage, each recording unit includes two pens to mark simultaneously on the chart, the graph drawn by one stylus 30 being continuous and to a small scale, while the graph drawn by one of a number of other pens 31 is interrupted or sectional, but to a larger scale, and is in the nature of a vernier graph. Thus, as shown in Figure 1, the line A drawn by the pen 30 of the left recording unit 3 is continuous, and the sectional graph *a* drawn by several of the pens 31 of the left recorder is discontinuous, although its sections are sequential. Similarly, the graph B drawn by the pen 30 of the right recording unit 3 in Figure 1 is continuous, whereas the graph *b* is discontinuous, but its sections are sequential.

The data recorded by the continuous graph drawn by the pen 30 of the recording unit 3 is the same as that represented by the sectional graph drawn by the several pens 31. These two graphs, for example A and *a*, shown in Figure 1, are the same shape, the only difference being in the scale of the graphs transversely of the strip or chart 1 and the discontinuity of graph *a*. In each instance a definite magnification relationship exists between the continuous and the interrupted graphs.

Either of these graphs in itself would, however, be inadequate, since graph A is to such small scale that it cannot be read to the required accuracy, while graph *a*, although to large scale, is not in terms of absolute value but is related to zero in known manner, reading (in the example shown) only the last digit of the numerical value being recorded. The manner of cooerdinating the two graphs will be more fully discussed subsequently.

Figures 5, 6:
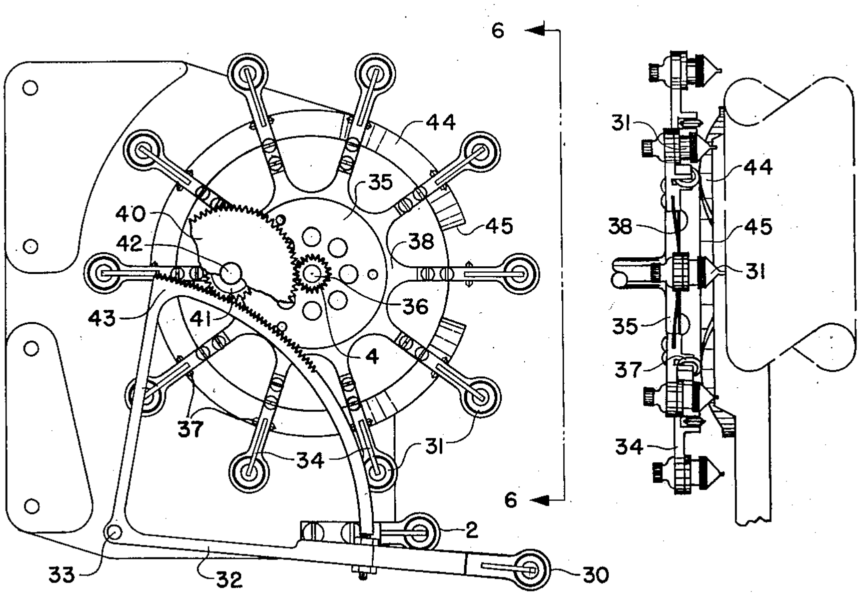
Figure 5 is a sectional view of a portion of the recorder taken on line 5—5 of Figure 4.
Figure 6 is a fragmentary view taken on line 6—6 of Figure 5.
Figure 4:
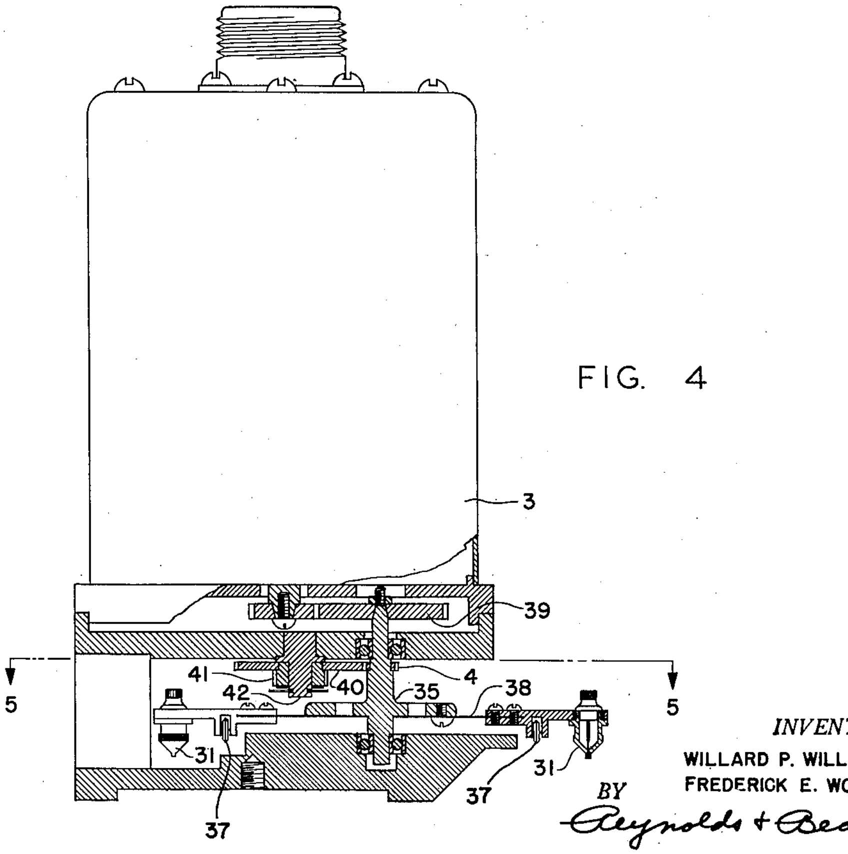
Figure 4 is an enlarged sectional view through a portion of the mechanism shown in Figure 2.

In order to preserve a definite ratio between the movements of pen 30 and a pen 31 transversely of the chart 1, the movement of the mechanism supporting such pens must be coordinated. This is accomplished by mechanically interconnecting the drive mechanism for the respective pens, such as by suitable gearing, an example of which is shown in Figures 4 and 5. The pen 30 is carried by the swinging end of arm 32, which is swingable about the fixed pivot 33, defining an axis perpendicular to the recording surface of chart 1. A number of pens 31 are provided, each supported on the end of a spider arm 34 projecting radially outward from a spider-supporting disc 35. This disc is mounted on a central pivot 36 to rotate about an axis perpendicular to the recording surface of the chart, and consequently parallel to the axis of pivot 33.

Fixed to the center of disc 35 is a gear 4 forming one element of a gear train interconnecting such disc and arm 32. The remainder of the gear train is composed of the idler gears 40 and 41 rotatable about a fixed pivot 42, and a gear sector 43 carried by arm 32. To afford a sufficient difference in angular movement between arm 32 and disc 35, gear 40, meshing with gear 4, is larger than either of gears 41 or 4, while the radius of gear 41 is much smaller than the radius of gear sector 43. In the particular example illustrated the reduction between gears 4 and 40 is four to one, and that between gear 41 and gear sector 43 is ten to one, making a total reduction of 40 to 1.

The distance between pen 30 and the pivot 33 of its arm 32 is twice as great as the distance between each of the pens 31 and pivot 36 of their spider disc. Consequently for the same angular movement of their respective arms the transverse displacement of pen 30 will be substantially twice as great as that of a pen 31. Since the interconnection of arm 32 and disc 35 is by gearing having a forty to one drive ratio, the actual movement of each pen 31 will be twenty times as great as that of pen 30 in a direction transversely of the tape 1.

Only one pen 31 will mark on tape 1 at any given time, except that one such pen may be completing an end of its graph section at the same time that an adjacent pen is beginning its graph section. To prevent contact of more than one pen 31 with the chart at any given instant, except during such change from operation of one pen to that of the next, all of the inoperative pens over the recording surface of tape 1 are raised slightly, and only that pen directly above the tape and most nearly in line with its direction of movement will be in lowered position. All of the supporting arms for the pens 31 at all times, however, are maintained generally in a plane parallel to the tape's surface.

Control of the raising and lowering movement of the pens 31 at each side of the operative pen is afforded by lifting mechanism including a barrel cam ring or arc 44 arranged concentrically with pivot 36 or disc 35. This cam is shown best in Figures 5 and 6. Each arm 34 carries a cam follower roller 37 rotatable about an axis parallel to its arm and spaced from pivot 36 a distance equal to the radius of cam 44. The spider 38 is formed from sheet spring material, so that it will yield as the rollers 37 are raised by contact with the cam. The cam is interrupted at 45 between two oppositely inclined portions of adjacent crests, which serve to lift the rollers 37 as they ride up such portions, in turn deflecting upward the arms and raising their styluses 31.

The space 45 between the crests of cam 44, as shown in Figure 6, is dimensioned so that, in whichever direction disc 35 is rotated, as a roller 37 moves down off one inclined cam surface to lower its pen 31, the roller just ahead of that one in the direction of rotation of disc 35 will be riding up the other inclined surface of the cam to raise its pen 31 from contact with the tape 1. If rotation of the disc 35 continues in the same direction, successive pens 31 will be lowered into contact with the tape 1 and then raised from the tape, in the manner described, to draw a series of sequential graph sections, while arm 32 swings continuously in the same direction to draw the related uninterrupted reference graph. If desired, inks of various colors may be used in the individual pens to separately identify the graph sections they trace and thereby indicate the reference value of each section.

Figure 7:
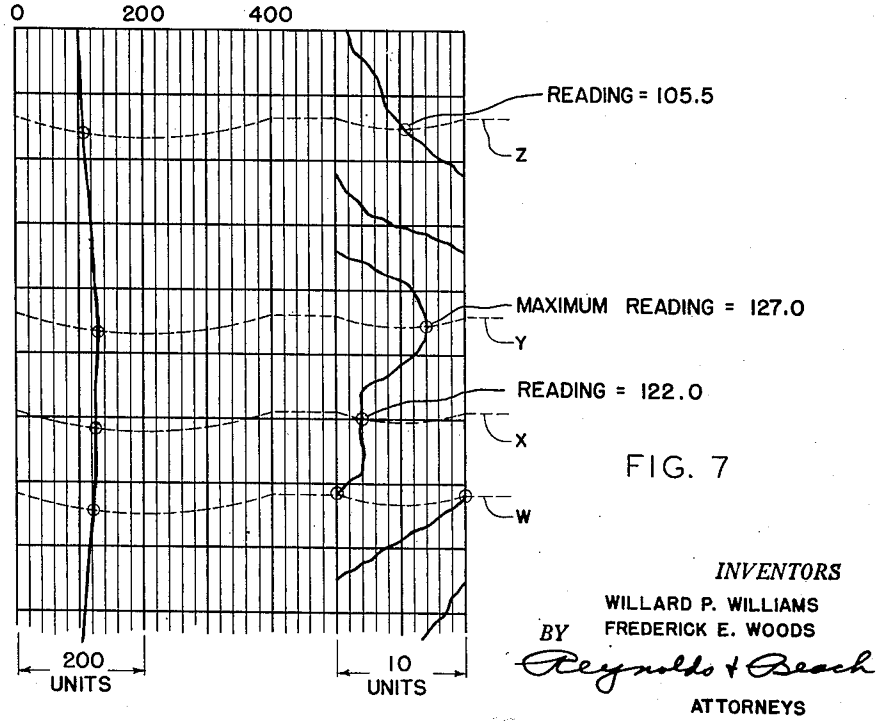
Figure 7 is a diagram illustrating the type of record produced by the instrument.

It will be seen that the mechanism described above will produce on the moving chart a continuous graph A, by pen 30, representing to small scale the total variation of the quantity being recorded, and by pens 31 a discontinuous graph *a* to a much larger scale. Illustrated in Figure 7 is a portion of such a pair of graphs, drawn to actual size. The ratio of scale of the two graphs is 20 to 1, the continuous graph covering a range of 400 units in two inches, while the large scale interrupted graph covers but 10 units in one inch. It will be noted that the two graphs, including a one-half inch space between them, occupy only 3½ inches of chart width, as compared to the 40 inches that would be required for a single continuous graph to the larger scale.

The chart shown in Figure 7 has straight transverse lines, and often sufficient accuracy may be attained by the use of these lines. However, for best results it is preferred to utilize transverse lines curved to correspond with the arcs traversed by the respective pens. Such curved lines are shown in dotted lines as W, X, Y and Z, illustrating the manner in which numerical values are read from the coordinated graphs. At line W it may be ascertained from the small scale graph that the reading is approximately 120, and this taken in conjunction with the large scale graph shows that the reading is precisely 120.0. Similarly, it may be seen that at line X the reading has risen to 122.0. A maximum of 127.0 is reached at line Y, while the reading drops to 105.5 at Z.

The continuous reference graph and the corresponding sectional graph are thus coordinated, so that the recorded data may be ascertained with accuracy from the two graphs, although the recording equipment which produces these graphs is very compact. In addition to the coordination of the data graphs themselves it is preferred, as previously explained, that reference graduations be applied to chart 1 at the same time. Thus, abscissae reference lines are drawn lengthwise of the tape 1 by the pens 2, while ordinate time graduations are drawn by the pen mounted on arm 18 and the stamper 16, although it is desirable to maintain the lineal speed of tape 1 as uniform as possible, and to keep it centered on its rollers 10, 11, 13 and 14. Any variation in speed or error in alignment of the tape will thus be indicated.

It will be evident, of course, depending upon the purpose for which the recorder is to be used, that various drive ratios between the continuous marking pen 30 and the discontinuous marking pens 31 may be employed. In any event, however, the drive ratio should be such that the movement of the latter pens is at least several times as great as that of the former pen. The term drive ratio should be understood to refer to the relative degrees of movement of the two pens irrespective of the particular mechanism interconnecting them to accomplish such different movements. In the device described the drive ratio depends both upon the degree of reduction effected by the gearing and the relative lengths of the arms supporting the respective pens. The number of pens used to draw the interrupted or sectional graph is a matter of choice or convenience, and does not alter the drive ratio of the two styluses, nor the magnification ratio of the sectional graph abscissae over the continuous graph abscissae.

We claim as our invention:

1. In recording mechanism employing a tape providing a recording surface, the combination of means operable to move said tape lengthwise, a stylus engageable with said tape, an arm pivoted about an axis perpendicular to said tape's recording surface and supporting said stylus for movement transversely of the direction of movement of said tape, a supporting member alongside said arm and pivoted to rotate about an axis parallel to the pivot axis of said arm, additional styluses carried by said supporting member in positions disposed circumferentially thereof for conjoint movement and for successive engagement one at a time with said tape between predetermined spaced limits thereon at a location substantially aligned with said first stylus transversely of the direction of movement of the tape, means interconnecting said arm and said supporting member for conjoint rotative movement to effect movement of said additional styluses through an amplitude several times as great as the movement of said first stylus, and drive means operable in response to variations in a factor to be measured to move simultaneously said arm, said supporting member and said interconnecting means, thereby to cause said first stylus to draw a continuous graph, and to cause said additional styluses to draw a discontinuous graph having its interruptions at points of intersection thereof with said spaced limits and composed of sections related to the continuous graph drawn by said first stylus and disposed in superposed relationship lengthwise of said tape.

2. Recording mechanism comprising a stylus engageable with a recording surface, a pivoted arm supporting said stylus for swinging across such surface, a supporting member pivoted about an axis parallel to the axis of said pivoted arm and having a plurality of arms, a plurality of additional styluses carried one by each of said supporting member's arms and engageable one at a time in succession with the same recording surface between predetermined spaced limits thereon, means interconnecting said supporting arm and said member for coordinating swinging of said arm with rotation of said supporting member to effect movement of said additional styluses through an amplitude several times as great as the amplitude of movement of said first stylus and bearing a definite relationship thereto, and drive means operable in response to variations in a factor to be measured to move simultaneously said arm, to cause said first stylus to draw a continuous graph, and said supporting member to cause said additional styluses to draw a discontinuous graph having its interruptions at points of intersection thereof with said spaced limits and composed of sections similar in shape to the continuous graph drawn by said first stylus but the deviation of the graph sections being amplified as compared to that of the continuous graph by the ratio of movement of said additional styluses to said first stylus.

3. Recording mechanism comprising a stylus engageable with a recording surface, an arm pivoted to swing about an axis perpendicular to the recording surface and supporting said stylus for swinging across such surface, a spider pivoted about an axis parallel to the axis of said pivoted arm and having a plurality of arms extending generally radially of its pivot, a plurality of additional styluses carried one by each of said spider arms and engageable one at a time in succession with the same recording surface between predetermined spaced limits thereon, reduction gearing interconnecting said supporting arm and said spider for coordinating swinging of said arm with rotation of said spider to effect movement of said additional styluses through an amplitude several times as great as the amplitude of movement of said first stylus and bearing a definite relationship thereto, and drive means operable in response to variations in a factor to be measured to move simultaneously said arm, to cause said first stylus to draw a continuous graph, and said spider to cause said additional styluses to draw a graph which is made discontinuous by interruption and resumption of drawing by succeeding styluses moving beyond and into the drawing space defined between said spaced limits, depending upon the extent of said variations.

4. In recording mechanism employing tape providing a recording surface, the combination of means operable to move said tape lengthwise, a stylus engageable with a recording surface, a pivoted arm supporting said stylus for swinging across such surface transversely of the direction of movement of said tape, a supporting member pivoted about an axis parallel to the axis of said pivoted arm and having a plurality of arms, a plurality of additional styluses carried one by each of said supporting member's arms and engageable one at a time in succession with the same recording surface between predetermined spaced limits thereon at a location substantially aligned with said first stylus transversely of the direction of movement of the tape, means operable to shift said additional styluses away from the plane of the recording surface when outside the space between said limits, means interconnecting said supporting arm and said member for coordinating swinging of said arm with rotation of said supporting member to effect movement of said additional styluses through an amplitude several times as great as the amplitude of movement of said first stylus and bearing a definite relationship thereto, and drive means operable in response to variations in a factor to be measured to move simultaneously said arm, to cause said first stylus to draw a continuous graph, and said supporting member to cause said additional styluses to draw a graph which is made discontinuous by interruption and resumption of drawing by succeeding styluses moving beyond and into the drawing space defined between said spaced limits, depending upon the extent of said variations, the scale of the latter graph being amplified as compared to that of the continuous graph by the ratio of movement of said additional styluses to said first stylus.

5. In recording mechanism employing tape providing a recording surface, the combination of means operable to move said tape lengthwise, a stylus engageable with the recording surface, an arm pivoted to swing about an axis perpendicular to the recording surface and supporting said stylus for swinging across such surface transversely of the direction of movement of said tape, a spider pivoted about an axis parallel to the axis of said pivoted arm and having a plurality of arms extending generally radially of its pivot, a plurality of additional styluses carried one by each of said spider arms and engageable one at a time in succession with the same recording surface between predetermined spaced limits thereon at a location substantially aligned with said first stylus transversely of the direction of movement of the tape, means operable to shift said additional styluses away from the plane of the recording surface when outside the space between said limits, said additional styluses being spaced from the spider pivot by a distance substantially half as great as the distance between said first stylus and the pivot axis of its supporting arm, reduction gearing interconnecting said supporting arm and said spider for coordinating swinging of said arm with rotation of said spider to effect movement of said additional styluses through an amplitude several times as great as the amplitude of movement of said first stylus and bearing a definite relationship thereto, and drive means operable in response to variations in a factor to be measured to move simultaneously said arm, to cause said first stylus to draw a continuous graph, and said spider to cause said additional styluses to draw a discontinuous graph having its interruptions at points of intersection thereof with said spaced limits and composed of sections similar in shape to the continuous graph drawn by said first stylus disposed in superposed relationship lengthwise of said tape, but the deviation of the graph sections being amplified as compared to that of the continuous graph by the ratio of movement of said additional styluses to said first stylus effected by the relative length of said supporting arm and said spider arms and the reduction of said gearing.

6. Mechanism for graphically recording two variables on a recording surface, comprising means adapted to support and guide the recording surface for progressive movement thereof in a direction corresponding to one variable to be recorded, a first recording stylus, a first member supporting and guiding said first stylus engaged with the recording surface for recording movement thereof in a direction generally transverse to said direction of movement of the recording surface, a plurality of additional styluses, a second member supporting and guiding said additional styluses in series arrangement with substantially uniform spacing between successive styluses engaged with said recording surface for movement of adjacent ones of said additional styluses successively between spaced recording limits on the recording surface in a direction generally transverse to said direction of movement of the recording surface, reversible input drive means movable in accordance with a second variable to be recorded, means interconnecting said input drive means and first supporting member and operable to effect recording movement of the first stylus in accordance with such second variable, and means interconnecting said input drive means and second supporting member and operable to effect recording movement of the additional styluses in accordance with such second variable at substantially greater amplitude than that of said first stylus.

7. Mechanism for graphically recording two variables on a recording surface, comprising means adapted to support and guide the recording surface for progressive movement thereof in a direction corresponding to one variable to be recorded, a first recording stylus and supporting arm therefor, a first pivotal stylus arm supporting member supporting said first stylus arm for swinging of said first stylus engaged with the recording surface through a recording arc in a direction generally transverse to said direction of movement of the recording surface, a plurality of additional styluses and supporting arms therefor, respectively, a second pivotal stylus arm supporting member supporting said additional stylus arms with substantially uniform angular spacing between successive arms, for swinging of said additional styluses conjointly to move individual styluses engaged with said recording surface successively transversing between spaced recording limits on the recording surface in a direction generally transverse to said direction of movement of the recording surface, reversible input drive means movable in accordance with a second variable to be recorded, means interconnecting said input drive means and first pivotal supporting member for recording movement of the first stylus in accordance with such second variable, and means interconnecting said input drive means and second pivotal supporting member for recording movement of the additional styluses in accordance with such second variable at substantially greater amplitude than that of said first stylus.

8. Recording mechanism for graphically recording two variables on a recording surface, comprising means adapted to support and guide the recording surface for progressive movement thereof in a direction corresponding to one variable to be recorded, stylus support means having a plurality of arms extending generally radially thereof, a stylus carried by each of said arms, pivot means supporting said stylus support means for rotation about an axis substantially perpendicular to the plane of the recording surface and disposed to move said styluses on said recording surface and successively between spaced limits thereon in a direction generally transverse to the direction of movement of such recording surface during progressive angular movement of said support means in either direction, reversible drive means movable in accordance with a second variable to be recorded and operatively connected to rotate said stylus support means correspondingly, and means cooperating with said support means and operable to hold said arms to maintain their respective styluses out of contact with the recording surface throughout angular movement of such styluses except that portion thereof extending directly between said spaced limits.

9. The recording mechanism defined in claim 8, wherein the arms carrying the styluses are individually urged resiliently in the direction to engage their styluses with the recording surface, and the arm holding means comprises cam means with raised portions extending circumferentially in opposite directions from the spaced limits, respectively, and arm-supported cam followers engageable with said raised portions to hold such arms away from the plane of the recording surface except between such spaced limits.

10. Recording mechanism employing linear tape having thereon in side-by-side relationship extending lengthwise thereof a small scale recording zone and a large scale recording zone, comprising constant speed tape drive means operable to move the tape lengthwise, signal-responsive, variable speed, reversible drive means, a small amplitude stylus, means supporting said small amplitude stylus in registry with the small scale tape zone, small amplitude actuating means operable to move said small amplitude stylus supporting means transversely of the direction of movement of the tape, a plurality of large amplitude styluses, a multiple stylus carrier carrying said large amplitude styluses and locating adjacent styluses spaced apart a distance substantially equal to the width of the large scale tape recording zone, means supporting said multiple stylus carrier and operable to dispose the styluses carried thereby in registry individually with the large scale tape recording zone, large amplitude actuating means operable to move said multiple stylus carrier, amplifying coordination means driven by said signal-responsive, variable speed, reversible drive means, interconnecting said small amplitude actuating means and said large amplitude actuating means, operable to effect movement of said large amplitude actuating means to move the styluses carried by said stylus carrier through a relatively large movement and operable to effect movement of said small amplitude actuating means to move said small amplitude stylus through a relatively small movement, and means operable to move into contact with the tape a large amplitude stylus at one side of the large scale tape recording zone, and simultaneously to remove from contact with the tape a large amplitude stylus at the opposite side of the large scale tape recording zone.

11. Recording mechanism comprising signal-responsive, variable speed, reversible drive means, a small amplitude stylus, means supporting said small amplitude stylus, small amplitude actuating means operable to move said small amplitude stylus supporting means, a plurality of large amplitude styluses, a multiple stylus carrier carrying said large amplitude styluses, means supporting said multiple stylus carrier and operable to dispose the styluses carried thereby in recording position individually, large amplitude actuating means operable to move said multiple stylus carrier, and amplifying coordination means driven by said signal-responsive, variable speed, reversible drive means, interconnecting said small amplitude actuating means and said large amplitude actuating means, operable to effect movement of said large amplitude actuating means to move the styluses carried by said stylus carrier through a relatively large movement and operable to effect movement of said small amplitude actuating means to move said small amplitude stylus through a relatively small movement.

12. Recording mechanism employing linear tape having thereon in side-by-side relationship extending lengthwise thereof a small scale recording zone and a large scale recording zone, comprising constant speed tape drive means operable to move the tape lengthwise, signal-responsive, variable speed, reversible drive means, a small amplitude stylus, means supporting said small amplitude stylus in registry with the small scale tape zone, small amplitude actuating means operable to move said small amplitude stylus supporting means transversely of the direction of movement of the tape, a plurality of large amplitude styluses, a rotary multiple stylus carrier spider including a plurality of arms each carrying one of said large amplitude styluses and locating adjacent styluses spaced apart circumferentially a distance substantially equal to the width of the large scale tape recording zone, means supporting said multiple stylus carrier spider and operable to dispose the styluses carried thereby in registry individually with the large scale tape recording zone, large amplitude actuating means operable to rotate said multiple spider, amplifying coordination means driven by said signal-responsive, variable speed, reversible drive means, interconnecting said small amplitude actuating means and said large amplitude actuating means, operable to effect movement of said large amplitude actuating means to move the styluses carried by said stylus carrier spider through a relatively large movement and operable to effect movement of said small amplitude actuating means to move said small amplitude stylus through a relatively small movement, and means operable to shift axially of said spider in one direction an arm thereof to move into contact with the tape a large amplitude stylus at one side of the large scale tape recording zone, and simultaneously to shift axially of said spider in the opposite direction another arm thereof to remove from contact with the tape a large amplitude stylus at the opposite side of the large scale tape recording zone.

FREDERICK E. WOODS.
WILLARD P. WILLIAMS.

REFERENCES CITED

The following references are of record in the file of this patent:

UNITED STATES PATENTS

| Number | Name | Date |
|---|---|---|
| 407,461 | Anderson | July 23, 1889 |
| 1,483,039 | Bickel | Feb. 5, 1924 |
| 1,784,522 | Harrison | Dec. 9, 1930 |
| 1,958,909 | Chappell et al. | May 15, 1934 |
| 2,198,171 | Mackenzie | Apr. 23, 1940 |
| 2,232,589 | Chappell et al. | Feb. 18, 1941 |
| 2,248,429 | Klein et al. | July 8, 1941 |
| 2,437,242 | Cole et al. | Mar. 9, 1948 |

FOREIGN PATENTS

| Number | Country | Date |
|---|---|---|
| 235,781 | Germany | June 20, 1911 |
| 529,011 | Germany | July 7, 1931 |